US011998006B2

(12) United States Patent
Thorvaldsdottir et al.

(10) Patent No.: US 11,998,006 B2
(45) Date of Patent: Jun. 4, 2024

(54) METHOD OF TISSUE PRESERVATION

(71) Applicant: EMBLA PRODUCTIONS HF., Reykjavík (IS)

(72) Inventors: Katrin Thorvaldsdottir, Reykjavík (IS); Daniel Coaten, Gardur (IS)

(73) Assignee: EMBLA PRODUCTIONS HF., Reykjavik (IS)

( * ) Notice: Subject to any disclaimer, the term of this patent is extended or adjusted under 35 U.S.C. 154(b) by 760 days.

(21) Appl. No.: 16/628,822

(22) PCT Filed: Jul. 9, 2018

(86) PCT No.: PCT/IS2018/050006
§ 371 (c)(1),
(2) Date: Jan. 6, 2020

(87) PCT Pub. No.: WO2019/008606
PCT Pub. Date: Jan. 10, 2019

(65) Prior Publication Data
US 2020/0128816 A1    Apr. 30, 2020

(30) Foreign Application Priority Data
Jul. 7, 2017    (IS) .......................................... 050183

(51) Int. Cl.
*A01N 3/00*    (2006.01)
*D01C 1/02*    (2006.01)

(52) U.S. Cl.
CPC    *A01N 3/00* (2013.01); *D01C 1/02* (2013.01)

(58) Field of Classification Search
CPC . A01N 3/00; D01C 1/02; A01H 13/00; A01H 15/00

USPC ............................................................ 427/4
See application file for complete search history.

(56) References Cited

U.S. PATENT DOCUMENTS

| 4,710,394 A | 12/1987 | Sellegaard |
| 2007/0267159 A1 | 11/2007 | Zhao |

FOREIGN PATENT DOCUMENTS

| CA | 1159270 | 12/1983 |
| CN | 106260467 A | * 1/2017 |
| CN | 106995938 A | 8/2017 |
| GB | 2028100 A | 3/1980 |
| WO | 9955152 | 11/1999 |
| WO | 2008073489 A2 | 6/2008 |

(Continued)

OTHER PUBLICATIONS

Haneef et al. Advanced Materials from Fungal Mycelium Fabrication and Tuning of Physical Properties Jan. 24, 2017.*

(Continued)

*Primary Examiner* — Kent L Bell
(74) *Attorney, Agent, or Firm* — Heslin Rothenberg Farley & Mesiti, P.C.

(57) ABSTRACT

A process of preserving tissue from one or more plant, fungus or algae species is provided. The process comprises treating such tissue by subsequent steps of (i) incubation with a weak acid solution; (ii) removal of excess acid; (iii) incubation with an aqueous sugar alcohol solution; (iv) removal of excess sugar alcohol; and (v) drying. Also provided is a textile material having a sheet like structure, and characterized in having an average thickness of about 0.2-5 mm and comprising about 2% to about 20% sugar alcohol.

10 Claims, 7 Drawing Sheets

(56) References Cited

FOREIGN PATENT DOCUMENTS

| WO | 2012071589 A2 | | 5/2012 |
|---|---|---|---|
| WO | WO2012071589 | * | 5/2012 |
| WO | 2013096891 A1 | | 6/2013 |
| WO | WO 2013/096891 A9 | * | 6/2013 |
| WO | WO2013096891 A | * | 6/2013 |
| WO | 2018014004 A1 | | 1/2018 |
| WO | WO2018014004 | * | 1/2018 |

OTHER PUBLICATIONS

Yabai—The Modern, Vibrant Fae of Japan; Kombu—A Sea Vegetable Packed With Savory Goodness; Jun. 20, 2017; 12 pages.*
Smith; Department of Commerce and Labor Bureau Of Fisheries; The Seaweed Industries of Japan—The Utilization of Seaweeds In The United States; 1905; 70 pages.*
Fische; Characterization of three Macroalgae; Saccharina latissimi, Alaria esculenta and Palmaria palmata—Effect of Different Harvesting Conditions; May 15, 2016; 112 pages.*
Mouritsen; American Scientist; The Science of Seaweeds; 2013; 28 pages.*
Guo et al.; ACS Sustainable Chem. Eng.; Contribution of Residual Proteins to the Thermomechanical Performance of Cellulosic Nanofibrils Isolated from Green Macroalgae; Jun. 12, 2017; 28 pages.*
International Search Report and Written Opinion issued in PCT/IS2018/050006 dated Nov. 12, 2018.
Muhammad Haneef et al., "Advanced Materials From Fungal Mycelium: Fabrication and Tuning of Physical Properties", Scientific Reports, vol. 7, No. 1, Jan. 24, 2017.
Iceland Search Report issued by Danish Patent and Trademark Office dated Nov. 29, 2017.

* cited by examiner ary sugar alcohols useful in the invention include glycerol
METHOD OF TISSUE PRESERVATION

CROSS REFERENCE TO RELATED APPLICATIONS

This application is a U.S. National Phase filing under 35 U.S.C. § 371 of International Application PCT/IS2018/050006, filed Jul. 9, 2018, and published as WO 2019/008606 A1 on Jan. 10, 2019. PCT/IS2018/050006 claims priority from Iceland application number 050183, filed Jul. 7, 2017. The entire contents of each of these prior applications are hereby incorporated herein by reference.

FIELD

The invention relates to methods of preserving tissue, in particular tissue from plants, fungi and algae. The invention also relates to textile material obtained by tissue preservation.

INTRODUCTION

Fixation of cells and biological tissue is a process of killing and stabilizing cellular contents for further use and/or observation. Many methods are known in the art depending on the purpose.

Chemical fixing is a common method for the fixation of biological samples for light and electron microscopy, and usually involves the use of coagulants such as ethanol and acetone and non-coagulants such as aldehydes and osmium tetroxide. These agents usually result in fixation of tissue by denaturing proteins, while preserving general cellular organization.

Although common, chemical fixation (sometimes called plastination) can result in cellular degradation, and some tissues are penetrated slowly, leading to inhomogeneous treatment of the tissue. Physical methods are therefore sometimes used, including cryofixation and microwave fixation. The former is more commonly used for animal tissue than plant tissue, while the latter has the advantage of accelerating fixation of tissue. However, a disadvantage of microwave fixation is that heating of the tissue may not be well controlled and therefore lead to damage to cells and tissue.

Textiles are created from many natural sources, including plants. Examples of plants used in creation of textiles include shrub (for cotton), herbaceous plants (for flax), grass pulp (bamboo), wood pulp (rayon) and *cannabis* (hemp). The most common method of using plants as source material is the generation of yarn by spinning raw fibres to produce long strands, which are subsequently weaved, knitted or otherwise used to produce textiles or cloth.

Leather production commonly involves the use of highly polluting materials to preserve and treat the hide/skin used in the process. Various methods are used in the pre-treatment of animal hide, while tanning is a method of converting proteins in the raw hide into stable material that does not putrefy. All of these methods, however, utilize harsh materials and conditions and are therefore environmentally unfriendly.

SUMMARY

The present invention provides an environmentally mild process for preserving and fixing biological tissue material, so that the resulting material is pliable yet strong, and can be used in a range of practical applications. The process is based on the surprising finding that treatment of biological tissue with a low concentration of an aqueous weak acid solution, and subsequent incubation with a sugar alcohol solution followed by drying results in a textile-like material that is flexible and mechanically strong, and is useful e.g. as a textile.

Thus, the invention provides a process of tissue preservation, the process comprising steps of (a) treating a tissue from one or more plant, fungus or algae species, or a mixture thereof, with an aqueous weak acid solution to generate a pretreated tissue material; (b) removing excess acid by rinsing the pretreated tissue material with an aqueous solution; (c) incubating the pretreated tissue material with an aqueous solution comprising of at least one sugar alcohol; (d) removing excess aqueous sugar alcohol to generate a preserved tissue material; and (e) drying the resulting preserved tissue material.

The tissue material can in general be vegetable based, and preferably succulent, i.e. having a high water or saline content in its fresh state. The material preferably also comprises a suitably sized and adequately supported macrostructure biomass. In other words, the material should have a macromolecular biomass that is suitable for preservation to generate textile-like materials. For example, the material should have a biomass that includes a body, leaf, blade, frond, root or the like that can be suitable for preservation.

The tissue material suitable for preservation can in general be from any plant, algae or fungus. Exemplary plants include members of the cactaceae family (cacti), plants with large leaves such as members of the polygonaceae family (e.g., rhubarb, *Rheum rharbarum*) and banana leaves.

The tissue material can in some embodiments be from an aquatic species, such as an aquatic plant and/or an aquatic algae. In particular, the tissue can be from one or more marine plant or marine algae.

The tissue material can be a fresh tissue, i.e. tissue that has not undergone any previous treatment. The tissue material can also be a tissue sample that has been previously dried. In such instances, the dried material can be rehydrated in water prior to the treatment with acid. Alternatively, a dried source material (e.g., dried plant, fungus or algae tissue can be treated directly with acid.

When provided as an algae, the tissue material can be from a macroalgae species selected from *Alaria, Laminaria* and *Saccharina* genuses. The algae can be selected from Alaria *esculenta, Laminaria digitata* and *Saccharina latissima*.

The sugar alcohol can be any sugar-derived polyol. Exemplary sugar alcohols useful in the invention include glycerol and sorbitol.

Treatment with sugar alcohol can include incubation with an aqueous sugar alcohol solution at a temperature that can generally be in the range of about 10° C. to about 90° C., about 20° C. to about 80° C., about 20° C. to about 70° C., about 20° C. to about 60° C., about 20° C. to about 50° C. or about 20° C. to about 40° C. Sugar alcohol treatment can also be done at a temperature of about 20° C. to about 25° C. or room temperature.

There can be an optional step of rinsing the treated material with water following the sugar alcohol incubation, to remove excess sugar alcohol.

The sugar alcohol step can also include the optional inclusion of activated charcoal, which can be added to the sugar alcohol solution prior to the incubation to remove undesired odours, and can be washed away by rising with a water solution following the incubation.

There can also be an optional stretching step that follows the sugar alcohol incubation. Such stretching is done to prevent shrinkage of the material when dried, but can also be done to confer uniform appearance of the resulting material.

Plants and algae are commonly infested by bacteria and fungi of various kinds. Natural degradation processes include fermentation by natural bacteria and fungi. Without intending to be limited by theory, it is believed that the process according to the invention has a bactericidal and/or fungicidal action. Processed tissue material (textile material) resulting from the process has been found to be stable to natural biological degradation (i.e., fermentation or rotting). The material is stable and pliable and can be used for a variety of downstream applications.

The dimensions of the tissue in the process will, in general, be dependent on the source material. In general, the tissue can have a macromolecular structure with a total surface area of at least 1 $cm^2$, preferably at least 10 $cm^2$, more preferably at least 50 $cm^2$, more preferably at least 100 $cm^2$, more preferably at least 200 $cm^2$ and even more preferably at least 500 $cm^2$.

The tissue can have a sheet-like structure, i.e. the tissue can have a thickness that is much smaller than its length and/or width. The sheet-like structure can have an average thickness in the range of about 0.1 to 5 mm. Preferably, the sheet-like structure is relatively homogeneous in thickness. For example, the thickness of the structure can vary by no more than about 80%, about 70%, about 60% or 50% from its average value in the structure.

Macroalgae material useful in the process can have an average length that is in the range of about 0.5 to about 5 meters, preferably about 1 to about 4 meters. The material average width can be in the range of about 5 to about 50 cm, preferably in the range of about 10 to about 40 cm. The macroalgae material can have an average thickness in the range of about 0.2 to about 1.5 mm, preferably about 0.3 to about 1.3 mm, more preferably about 0.4 to about 1 mm.

It can be preferable to undertake one or more treatment steps in the process using an aqueous solution that contains salt, to minimize the effects of osmotic pressure between the fresh tissue and the aqueous solutions used in the process. Thus, it has been found that the material is more tolerant to increased soak time in acid and/or base when provided in a saline solution such as seawater. The average salinity (total dissolved salt) in seawater is about 35,000 ppm.

Accordingly, it can be preferable that one or more aqueous solution used in the process have a salinity of about 35,000 ppm. It can be preferable to use seawater that includes one more additional component (e.g., acid, base, glycerol) in one or more step of the process in accordance with the invention. In other words, the water used in any of the steps of the invention can be seawater. When added to the aqueous solution used in the process, added salts in general can provide $Cl^-$, $Na^+$, $Mg^{2+}$, $SO^{2-}_4$, $Ca^{2+}$ and/or $K^+$ ions in a quantity that is similar to the concentration of these ions in sea water.

Experimentation with a wide variety of acids and bases, and in a variety of ratios, has been performed, as indicated in the Examples provided herein. In general, it was found that the composition of the acid used in the process affects the properties of the final material. Thus, increased concentration and/or prolonged incubation with acetic acid leads to formation of tougher but more brittle material. Incubation with increased amount of lactic acid resulted in more flexible, but more fragile material. Further, incubation with increased amount of citric acid can affect pigment coloration, in a way that the green colour is lighter. Consequently, the properties of the material can be adapted as desired, by using different acids, or mixtures of acids, so as to achieve the desired properties. These findings highlight the versatility of the process.

The weak acid solution is generally a solution comprising at least one organic or inorganic acid that has a pH in the range of about 1 to 5, preferably about 1 to 4, more preferably about 1 to 3, more preferably about 2 to 3.

The weak acid can be an acid that can have a pKa in the range of about 1 to 7, preferably in the range of about 2 to 6, more preferably in the range of about 3 to 6. The weak acid can be a single weak acid. Alternatively, the weak acid is a mixture of two or more weak acids. The weak acid is preferably an organic weak acid. The resulting mixture of acids can thus be a mixture of two or more organic acids, but can also be a mixture comprising one or more organic acid in combination with one or more inorganics acid.

The acid concentration in the acid treatment step can in general be in the range of about 1 to about 20% (v/v), such as about 2 to about 18%, such as about 3 to about 17%, about 3 to about 15%, about 3 to about 12%, or about 5 to about 10%. It can be preferable that the total acid concentration be no more than 20%, preferably no more than 18%, more preferably no more than 16%, even more preferably no more than about 14%. When present as a mixture of acids, the above concentrations preferably correspond to the total concentration of acid in the aqueous acid treatment solution.

The weak acid can have a pKa in the range of about 1 to 7, preferably in the range of about 2 to 6, more preferably in the range of about 3 to 6. In a preferred embodiment, the weak acid is an acid with a pKa in the range of about 3 to about 5.

The weak acid solution can have pH in the range of about 1 to about 5, preferably about 1 to about 4, more preferably about 2 to about 4, more preferably about 1 to about 3, even more preferably about 2 to about 3.

The aqueous weak acid solution in an embodiment comprises at least one organic acid selected from the group consisting of acetic acid, lactic acid and citric acid, or mixtures thereof. In an embodiment, the aqueous weak acid solution consists of 5-10% acetic acid.

The treatment with acid can be performed at a temperature in the range of about 10-90° C., preferably about 10-60° C., more preferably about 15-60° C., more preferably about 15-50° C., more preferably about 15-40° C., more preferably about 15-30° C. The treatment with acid can preferably be performed at room temperature.

It can be desirable to introduce a colouring agent into the acid mixture, to confer particular colour properties to the final processed material. Accordingly, the weak acid mixture can comprise one or more colouring agent or dye. The colouring agent can be a tissue-penetrating agent, so that the treated tissue becomes uniformly coloured.

The rinsing that follows incubation with the weak acid solution can be done with an aqueous solution with no added buffering agent. It can however be beneficial to add a weak base to the solution. Accordingly, the rinsing with an aqueous solution in step b) can comprise rinsing with a weakly basic aqueous solution. Such a solution preferably comprises one or more weak base, for example a base having a pKa in the range of about 8 to about 11, preferably a pKa in the range of about 9 to about 11. As a consequence, the resulting aqueous solution in step b) can have a pH in the range of about 7 to about 10, preferably about 8 to about 10, more preferably about 8 to about 9.

The weak base can be any suitable weak base or a mixture of two or more basic compounds. The weak base can comprise sodium bicarbonate, which can optionally be included in a mixture with one or more additional base.

The base can alternatively or additionally be calcium hydroxide. When used, calcium hydroxide provides calcium ions that may react with alginate in e.g. macroalgae to form calcium alginate, thereby fixing alginate in the material.

The method can also include the use of one or more extract of vegetable source, such as extracts from bark, leaves, roots, berries or wood. In one such embodiment, the process includes use of a bark extract. In another embodiment, the process includes the use of root extract. In another embodiment, the process includes the use of wood extract. The bark or wood extract can be from any suitable wood species, such as for example birch, oak, pine, cedar, cypress, fir, larch, redwood, spruce, acacia, alder, chestnut, ash, basswood, walnut, camphor, cherry, cottonwood, elm, *eucalyptus*, ironwood, mahogany, maple, olive, teak, bamboo or palm.

The process can also include a combination of two or more such extracts, from one or more source, such as combinations of one or more bark extract, combinations of one or more bark extract with one or more wood extract, one or more bark extract with one or more root extract, etc. The extracts can be provided in liquid or solid form, i.e. as a liquid extract or a solid extract.

Preferably, the solid extract when so provided is a fine powder that dissolves readily in water. Examples of suitable extracts are extracts from birch, cactus, thistles, nettle and bamboo.

The method can also use vegetable powder, such as bark, root and/or wood powder, or the like. Such powder can be provided as a finely ground powder of a dried source material (bark, root, wood, leave, berry). In one embodiment, the powder is a bark powder. In another embodiment, the powder is a root powder. In another embodiment, the powder is a wood powder. The powder can also be a mixture of powders from multiple sources, e.g., from two or more sources of bark, from one or more source of bark in combination with one or more source of root, etc.

Such vegetable extracts or powder can be added during the acid treatment step of the process. Without being bound by theory, it is believed that through the addition of such additional material during the acid treatment step, the material is able to penetrate the tissue to give it desirable physical properties, such as increased tensile strength, improved water tolerance and/or improved tolerance to heat.

The process can also include the use of alginate and/or Aloe Vera that can be added during the acid treatment step. Alginate and/or Aloe Vera can also be added following treatment with acid.

Another downstream application is that of treating the preserved tissue material with one or more surface treatment agent. In general, the surface treatment agent should be (i) compatible with the tissue material, i.e. have similar solubility parameters; (ii) efficient, in that a small amount of the agent should ideally be required to produce the desired properties; and (iii) permanent, i.e. the agent should not be lost from the material during normal use, or lost by vaporization or when the material comes into contact with a liquid, such as water. Preferably, the surface treatment agent is also water-resistant or water-proof, thereby rendering the treated material resistant to water.

The surface treatment agent can preferably be a sugar ester, for example a triester, such as triacetin (1,2,3-triacetoxypropane, also known as glycerin triacetate) or sorbitol hexaacetate (1,2,3,4,5,6-hexa-O-acetyl-D-glucitol), also known as d-sorbitol hexaacetate.

The surface treatment agent can alternatively or additionally comprise a fatty acid methyl ester (FAME).

The surface treatment agent can also comprise one or more wax, which are organic compounds that are lipophilic in nature and are malleable solids at or near room temperature (20-25° C.). Waxes are naturally produced by plants and animals, and also occur in petroleum. In some embodiments, the wax is a plant or animal wax, or mixtures thereof. In some embodiments, the wax is a plant wax, such as carauba wax. In some embodiments, the wax is an animal wax, such as beeswax. The wax can also comprise, or consist of, one or more modified plant or animal wax. In some embodiments, the wax is a petroleum derived wax. In some embodiments, the wax is a polymer-based wax, such as Nikwax®.

In some embodiments, the surface treatment agent is a silicon-based coating agent.

When used on algae or macroalgae, both the stipe and the blade of the algae can be used. The resulting fixed material (textile material) can be assembled into larger textiles by conventional techniques, such as by sowing or stitching or by using adhesive. For that purpose, conventional methods and natural or synthetic adhesive agents can be used. For example, coating that comprises a combination of milk, water, gelatine and an oil such as clove oil has adhesive properties. Consequently, the treated textile material that is coated using such coating can be assembled into larger textiles, taking advantage of the self-adhesive properties of the material. The treated material (textile) can also be stitched or glued onto another textile.

Natural adhesive materials (bioadhesives) include starch, natural resins or animal resins, such as the milk protein casein, and hide-based animal glues.

Synthetic adhesives include for example elastomers, thermoplastics, emulsions and thermosetting adhesives (e.g., epoxy, polyurethane, cyanoacrylate and acrylic polymers). The material that is obtained by the process of the invention has an intact cellular structure in that it maintains its cellular macrostructure, as shown herein (e.g., FIG. 6). Thus, following the treatment steps described herein, the cellular structure of the tissue material remains intact. In other words, the cells maintain their macrostructure and shape as found in the living tissue, which is believed to represent the foundation of the properties of the treated material.

The invention further provides a tissue or textile material obtained by the process as described herein. The processed tissue in accordance with the invention has the characteristics and usefulness as a textile material, as further disclosed herein. The resulting material can therefore both be described as a textile or as a tissue, since the resulting textile material comprises processed tissue material.

Further, the invention provides textile material having a sheet-like structure with an average thickness in the range of about 0.2-5 mm, the textile material comprising tissue from at least one plant, fungus or algae species, or combinations of tissue from at least one plant, fungus or algae species, the tissue having an essentially intact cellular structure, the textile material further comprising about 2% to about 20% (w/w) sugar alcohol. The textile material may also essentially consist of tissue from at least one plant, fungus or algae species, or combinations of tissue from at least one plant, fungus or algae species, the tissue having an essentially intact cellular structure, the textile material further comprising about 2% to about 20% (w/w) sugar alcohol.

The textile material is characterized by considerable tensile strength. Thus, the tensile strength of the material can be at least about 5 kg/cm$^2$, preferably at least about 10 kg/cm$^2$, more preferably at least about 20 kg/cm$^2$. The textile material can preferably be from a macroalgae, wherein the macroalgae is preferably selected from the group consisting of *Laminaria digitate, Saccharina latissima* and *Alaria esculenta*. Further embodiments of the properties of the textile material are provided by the description herein, including the variations and examples provided.

Thus, the above features along with additional details of the invention, are described further in the examples below, which are intended to further illustrate the invention but are not intended to limit its scope in any way.

BRIEF DESCRIPTION OF THE DRAWINGS

The skilled person will understand that the drawings, described below, are for illustration purposes only. The drawings are not intended to limit the scope of the present teachings in any way.

DESCRIPTION OF VARIOUS EMBODIMENTS

In the following, exemplary embodiments of the invention will be described, referring to the figures. These examples are provided to provide further understanding of the invention, without limiting its scope.

In the following description, a series of steps are described. The skilled person will appreciate that unless required by the context, the order of steps is not critical for the resulting configuration and its effect. Further, it will be apparent to the skilled person that irrespective of the order of steps, the presence or absence of time delay between steps, can be present between some or all of the described steps.

The process and material according to the invention is illustrated in the non-limiting embodiments that follow.

The present invention provides a method or process for the preservation of tissue material, including tissue material from plants, fungi and/or algae, or mixtures thereof. The invention is in particular useful for the preservation and fixation of large sheet-like tissues, such as tissue from macroalgae, for preparation of textiles or textile-like materials.

In the following, the process of preserving tissue accordance with the invention will be described in more detail, referring in particular to FIG. 1 to FIG. 6.

Figure 1:
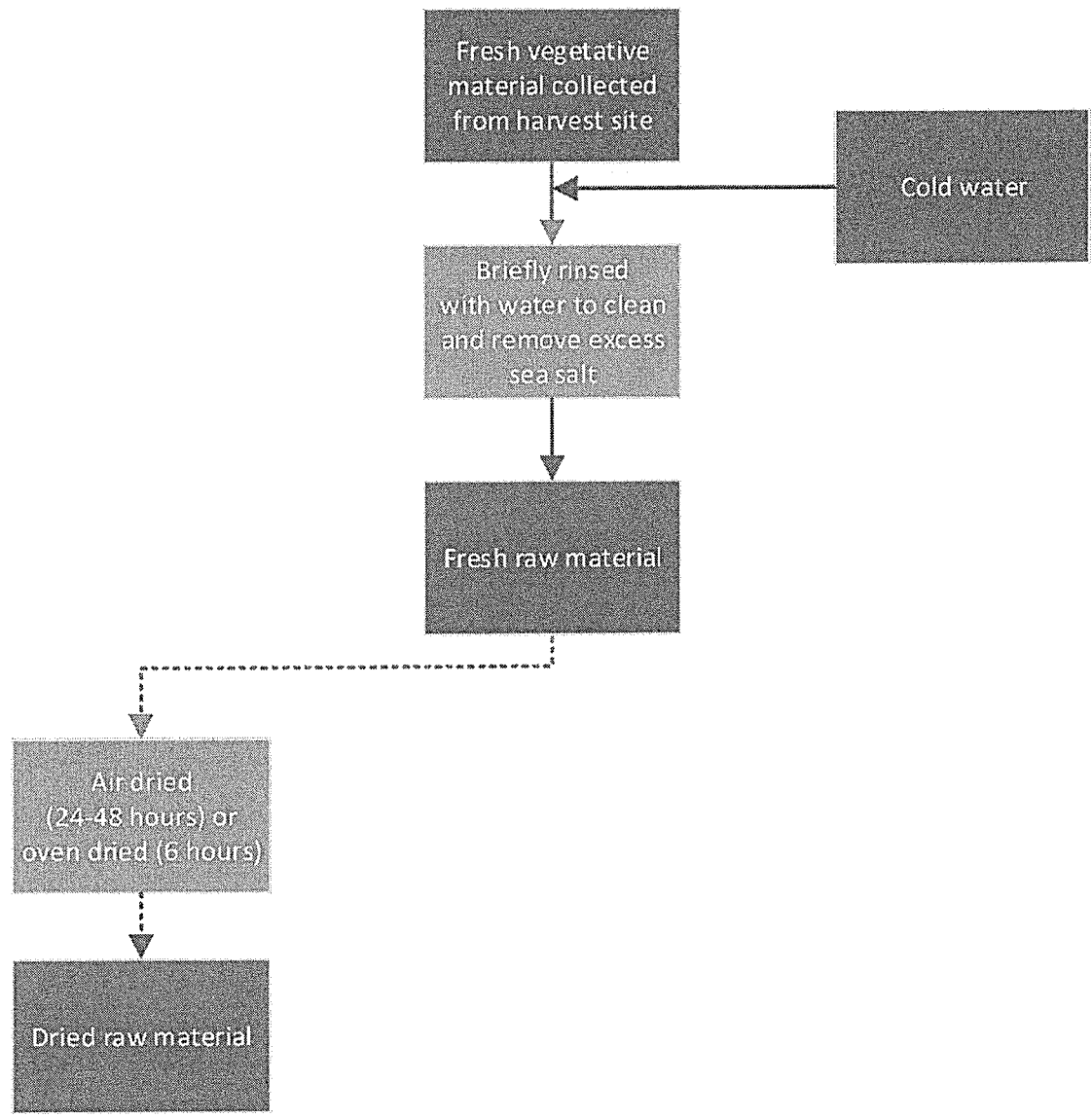
FIG. 1 shows a schematic layout of the preparation of raw tissue material that can be used in the processes of the invention. Optional or alternative steps are shown by dotted lines.

Referring to FIG. 1, freshly harvested tissue samples (from plant, fungi and/or algae) are collected. The material can be first rinsed with ambient or cold fresh water to remove any debris. The rinsed raw material can optionally be dried prior to being preserved. Such drying can be done by air drying, for 24 to 48 hours or by drying in an oven (about 6 hours or less).

Figure 2:
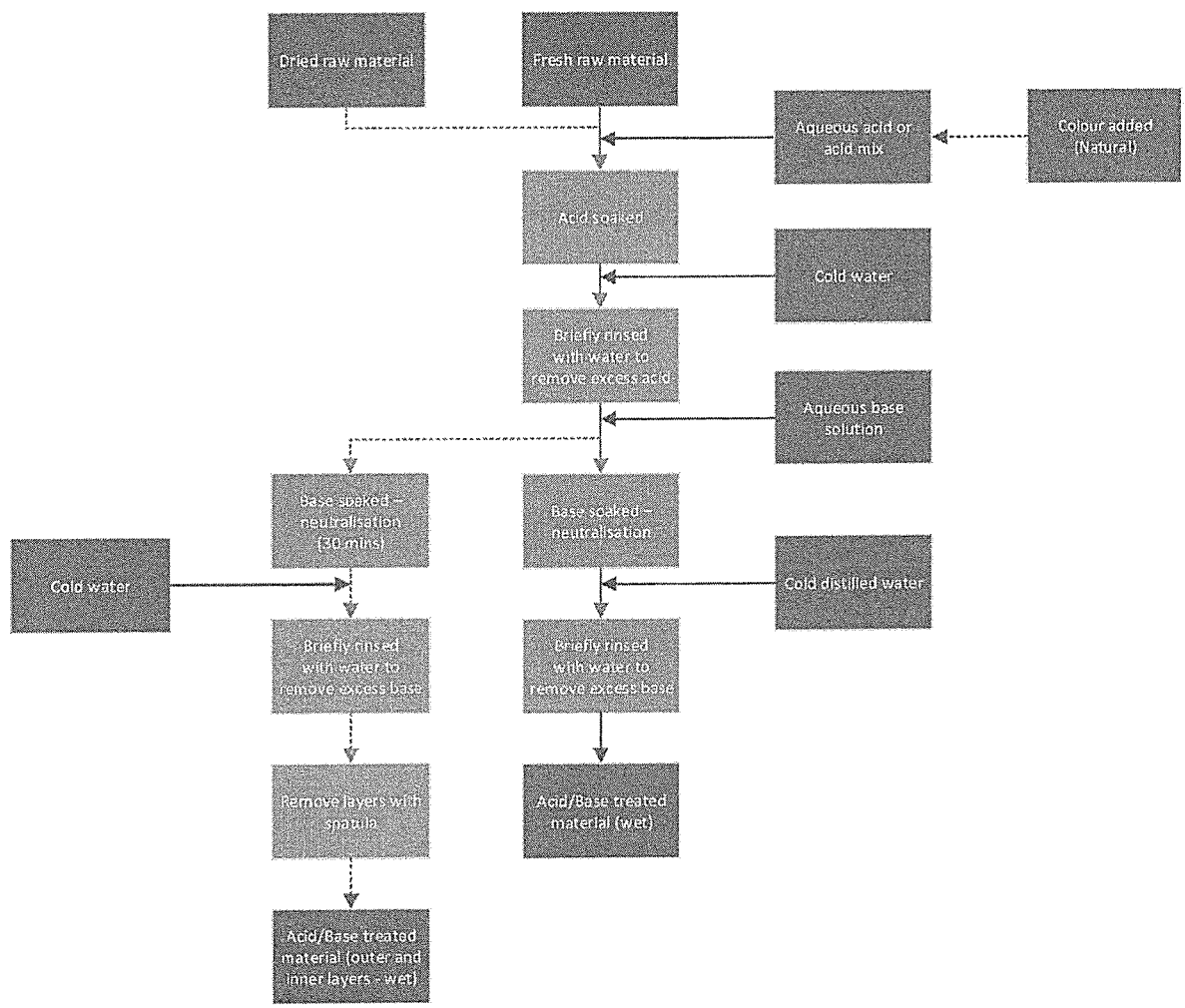
FIG. 2 shows a schematic layout of acid/base treatment of tissue material in accordance with the invention. Optional or alternative steps are shown by dotted lines.

Following rinsing, fresh raw material is then soaked (submerged) in an aqueous solution of acid/s, as shown in FIG. 2. As described in the above and highlighted by the Examples, both the nature of the acid and its concentration can be varied in the process. The volume of the acid bath should be sufficient to completely immerse the tissue but can otherwise be adjusted as deemed appropriate for the amount of tissue to be processed. Different concentration and incubation time results in material with different properties (increasingly brittle upon prolonged incubation or use of high concentration). The acid can preferably be an aqueous 7% (total) mixture of acetic, lactic and citric/ascorbic acid (in the ratio of 6:3:1). Treatment with acid can be done with gentle occasional agitation for at least 24 hours and preferably no more than 48 or 72 hours.

In some embodiments, the treatment with acid is performed over a time period that is no more than 48 hours, no more than 24 hours, preferably no more than 12 hours, more preferably no more than 6, even more preferably no more than 4 hours.

The acid treatment step can be performed over a time period that is in the range of about 1 to about 24 hours, such as about 1 to about 12 hours, such as about 1 to about 6 hours, such as about 2 to about 6 hours, such as about 1 to about 4 hours, such as about 2 to about 4 hours, or about 3 to about 4 hours.

After acid treatment, the samples are briefly rinsed using cold fresh water to facilitate the removal of excess acid from the outer layer of the material. This is however an optional step and it is possible to proceed directly with the following base treatment step. Next, any remaining acid is neutralised by soaking (submerging) the acid-treated tissue in a diluted weak base. Again, in principle any suitable weak base can be used in the process. It can be preferably to use an aqueous sodium bicarbonate solution that comprises in the range of about 0.5% to 10% sodium bicarbonate, such as about 1% to about 8% or about 1 to about 4% sodium bicarbonate. In preferred embodiments, the base can comprise or consist of an aqueous solution of sodium bicarbonate that is about 1%, about 1.5%, about 2%, about 2.5% or about 3% (w/v) sodium bicarbonate in water. The treatment with base can be performed over a time period of up to several hours or more, such as up to 12 hours, up to 8 hours, up to 4 hours, up to 2 hours, or up to 1 hour. Base treatment can preferably include a gentle occasional agitation for a maximum of 60 minutes, such as a maximum of 45 minutes, a maximum of 30 minutes, a maximum of 20 minutes or a maximum of 10 minutes. A further cold fresh water rinse is then applied to the material to remove excess base.

Other bases known in the art are also possible. For example, the base can also be an aqueous solution of calcium hydroxide ($Ca(OH)_2$). Treatment with a calcium salt of a base can have the further advantage that calcium ions can interact with alginate in the material that is being treated and provide support to the material by binding alginate as a calcium salt (calcium alginate).

Figure 3:
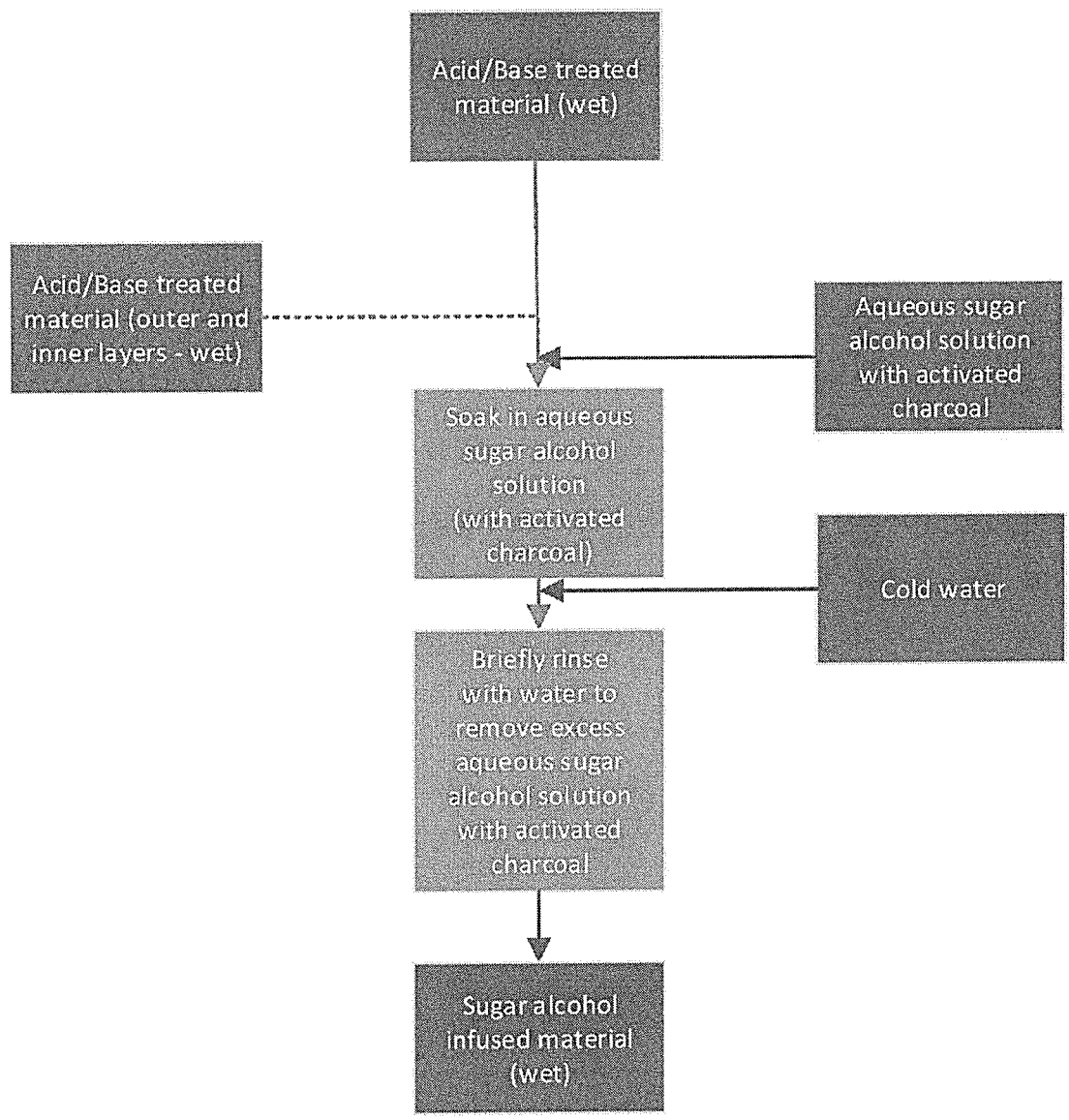
FIG. 3 shows a schematic layout of the incubation of acid/base treated tissue material with sugar alcohol. Optional or alternative steps are shown by dotted lines.

The wet tissue is subsequently subject to soaking (submerged), as illustrated in FIG. 3, this time in an aqueous sugar alcohol solution. The sugar alcohol can suitably be glycerol, such as an aqueous 25% glycerol solution. The solution can also contain a suspension of activated charcoal (about 1% of total solution) to remove odours. Moreover, it can be advantageous to subject the solution to gentle occasional agitation for at least 24 hours (maximum of 72 hours).

Following treatment with sugar alcohol, the preserved tissue material can be subject to a final cold fresh water rinse to remove any excess glycerol/charcoal.

The resulting preserved tissue material can subsequently be dried and used as is in downstream applications, or the preserved material can undergo additional treatment steps. It will be apparent to the skilled person that the additional treatments can be performed in any desired sequence and combination to produce preserved tissue material with particularly desirable properties.

Figure 4:
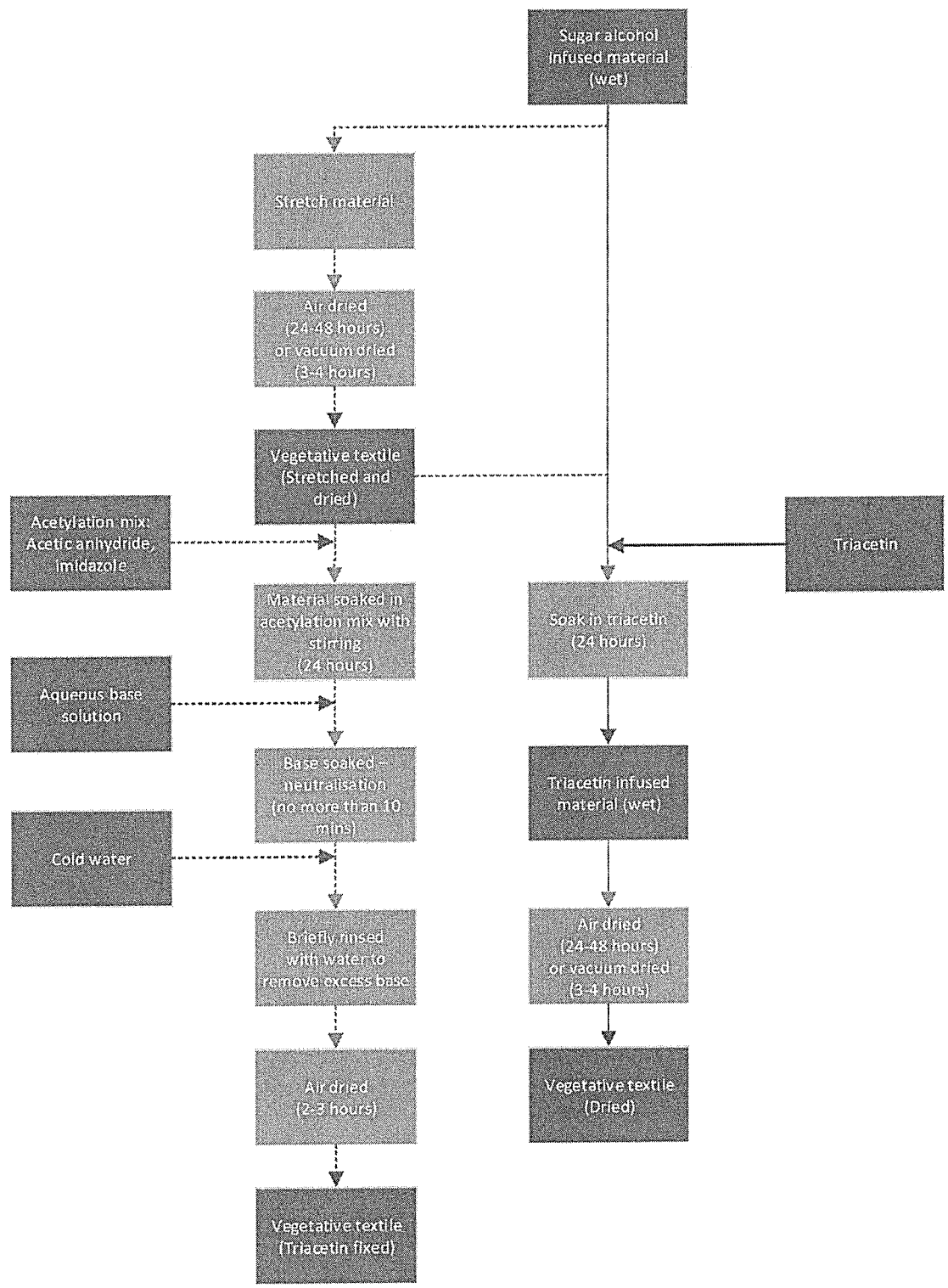
FIG. 4 shows a schematic layout of treatment of sugar alcohol infused material with a surface treatment agent (triacetin), and optional/additional steps of stretching/acetylation.

One such additional treatment step, as illustrated in FIG. 4, is a step of stretching the material following drying (indicated by dotted lines). Stretching the material following preservation provides a more uniform structure in the material (i.e., the material has a more uniform thickness), and also provides for a smooth outer texture. As a consequence, the material becomes easier to work with in downstream applications. Stretching can preferably be done by use of a stretching rack, or alternatively by using other conventional means for stretching tissue material, such as those used to stretch/process animal hides.

The preserved tissue material can be soaked (submerged) in a surface treatment agent, preferably a water-resistant agent such as a natural or synthetic wax, a triester, such as triacetin, for a period of at least 12 hours, and more preferably more than 24 hours (see FIG. 4). The resultant material is then removed and excess surface treatment agent (e.g. triester) is drained and/or wiped away before being allowed to air dry for up to 48 hours, for example by letting the material hang vertically at a temperature of 20-22° C. (see FIG. 4). Alternatively, the material can be dried by vacuum drying, which typically takes much less time, such as about 3 to 4 hours.

The material can be stretched prior to treatment with a surface treatment agent. Thus, there can be a step of stretching the sugar alcohol-infused material prior to treatment with a surface treatment agent.

Alternatively, the preserved tissue material can, in a fixing treatment, be treated with reagents that react in situ to enhance the characteristics of the material, including its strength, water-resistance and pliability. For example, as also shown in an alternative series of steps in FIG. 4, the material can, following sugar alcohol treatment, be stretched and subsequently dried (air-dried or dried by vacuum). The resulting textile material can then be soaked in an acetylation mix comprising acetic acid and imidazole. These compounds react in situ to form triacetin, thereby providing an alternative way to treat the material by in-situ fixing.

Following the fixing, the material can be neutralized by incubation with a weak base, rinsed with water to remove excess base and dried.

Figure 5:
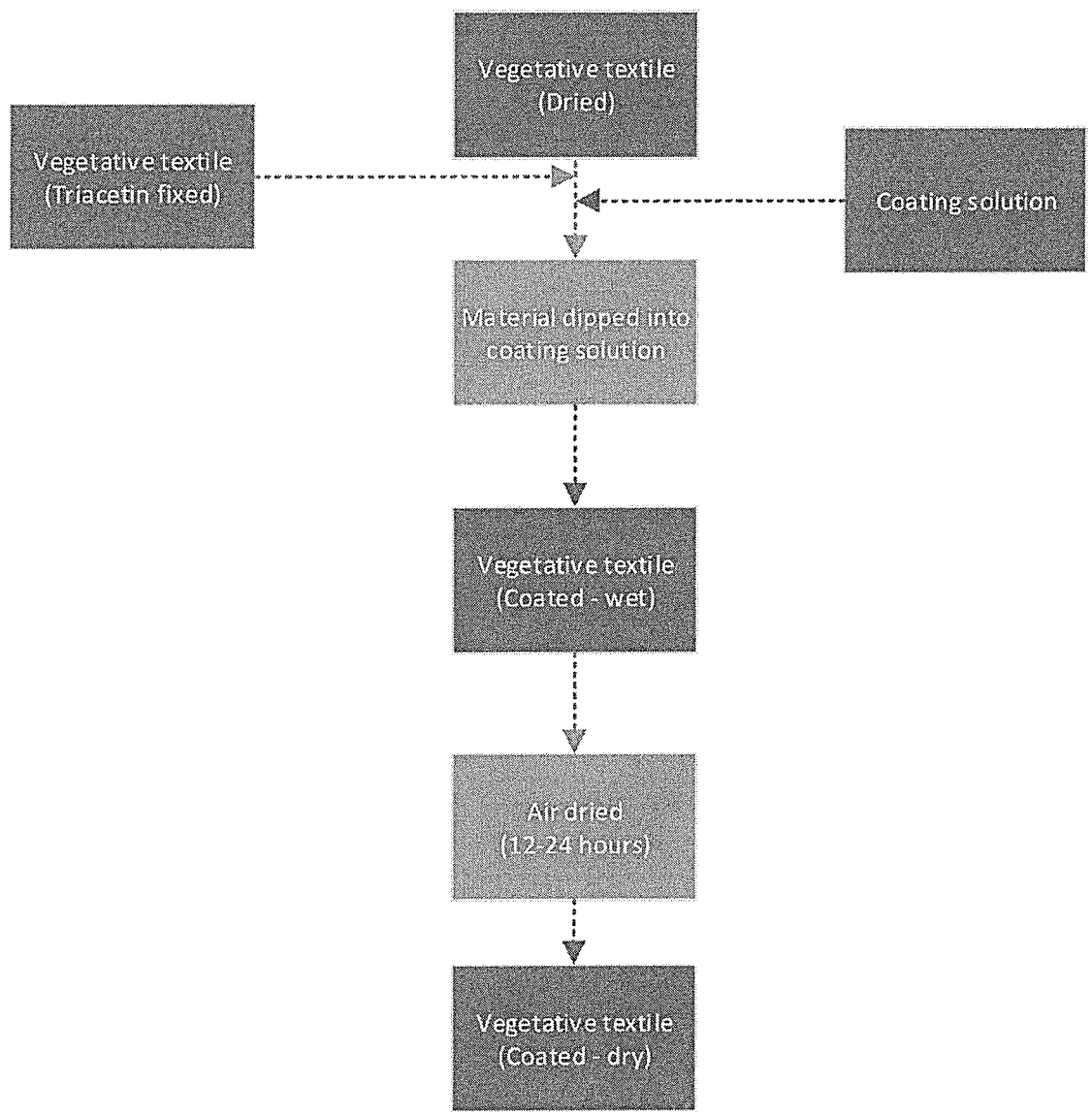
FIG. 5 shows a schematic layout of treatment of preserved and optionally fixed tissue material with a coating agent.

As an additional downstream treatment step, the preserved tissue material (obtained by any previous method, such as by surface treatment and drying, or be triacetin in situ fixing) can be coated, as illustrated in FIG. 5. Coating is achieved by immersing the preserved tissue, either as is, or following surface treatment, in a coating solution, such as a mixture of milk, water, gelatine and an oil such as clove oil. Coating can also be performed using fatty acid methyl esters (FAME), such as those produced in the manufacture of biodiesel (obtained by transesterification of fats with methanol). While the surface treatment can penetrate the outer layers of the material and thus affect its physical properties, the coating solution primarily serves the function of providing a coating on the material, with little or no other effects on its properties (i.e., the coating preferably does not penetrate the material). Following the soaking in a coating solution, the material is dried, resulting in a preserved, coated tissue material.

An important and valuable consequence of the process of the invention is that the cellular structure of the tissue material remains intact after treatment. This contrasts with many methods in the art, in which the starting tissue material is at least partially if not completely destroyed during treatment, with only the mixture of extracted compounds from the tissue being used in subsequent processing to generate downstream products, such as artificial textiles and bioplastics.

Figure 6:
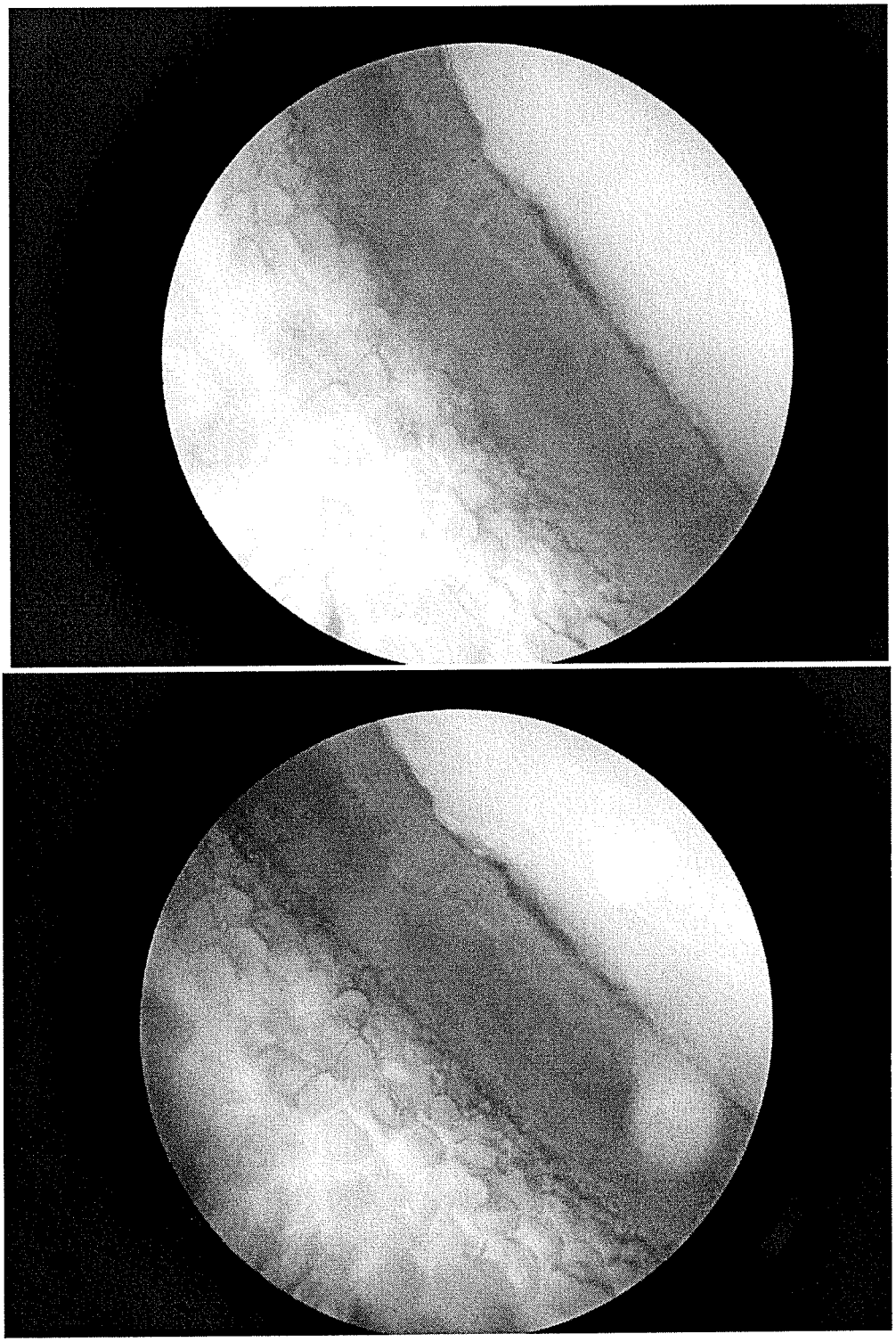
FIG. 6 shows microscopic images of tissue from *L. digitata* before (a) and after (b) processing in accordance with the process of the invention.

Thus, in FIG. 6 a microscopic image of a small (approx. 2 mm) section of a starting tissue of *L. digitata* is shown in (a). Intact cells can clearly be observed in the image. In (b), an image of *L. digitata* tissue following treatment according to the invention is shown. As can be seen, the cellular structure of the starting material is preserved after the treatment. Thus the cells appear to be intact and the general cellular architecture of the material preserved, which illustrates the mild nature of the preservation process.

In the following, variations of the process of the invention are provided. As will be apparent, these variations can be performed in combination with other variations and/or with the general process as described herein.

As described in the above, the dimensions of the fresh starting material is variable, and will depend on the natural variation of the actual species being used, for *L. digitata* the starting material has an average length of about 2 meters, average width of about 300 mm, and an average thickness of about 1 mm. The *L. digitata* finished material has an average length of about 2 meters, average width of about 300 mm, and an average thickness of about 0.6 mm.

For *S. latissima* starting material, the average length can be about 1.5 meters, the average width about 100 mm, and the average thickness (stretched) about 0.8 mm. For the *S. latissima* finished material, the average length is about 1.5 meters, the average width about 100 mm, and the average thickness (stretched) about 0.5 mm.

For *A. esculenta* starting material the average length is about 3 meters, average width about 100 mm, and average thickness about 0.7 mm. The finished *A. esculenta* material has average length of about 3 meters, average width of about 100 mm, and average thickness of about 0.4 mm.

The resulting material from the process has many potential uses. The material can be used as a textile material in the manufacture of clothes or clothing items, in upholstery, in drapes or curtains, in furniture or household items such as lamps. The material can be used as such, or it can be used in combination with other textiles or other source materials. The material can be sown or glued together, or it can be sown or glued to other textiles or other supports as desired. Thereby, the material can be used in combination with any other textile to generate hybrid textile materials with desirable properties and/or aesthetics.

Figure 7:
FIG. 7 shows an example where a treated tissue from *Saccharina latissima* has been stitched onto a denim material.

An illustration of the use of the treated material is shown in FIG. 7, where a small patch of treated *Saccharina latissima* according to the process disclosed herein has been stitched onto denim material. The material is easily stitchable onto the denim material, illustrating its usefulness as a textile, whether alone (with multiple pieces of treated material being stitched together as desired), or stitched onto another textile. Hybrid materials containing patches of other textile (e.g, denim) stiched to e.g. treated seaweed patches in a side-by-side fashion can also be generated in the same fashion. As can be observed, the treated tissue retains its natural look and the tissue is also quite strong and resistant to moisture, as the examples provided also illustrate. As an optional feature, the treated material can be coated, e.g. with a water-repellant coating such as a wax or wax-like material, to improve its resistance to weather.

Variation 1: Seawater

Fresh material is processed in the same manner as described in the general description in the above. However, freshly collected seawater (salinity of approx. 35%) is used in place of fresh water to facilitate the acid soak, base wash, and sugar alcohol soak steps in the process.

Variation 2: Dry Harvesting

Freshly harvested tissue material is first air dried for 48 hours (hung up vertically in a temperature of 20-22° C.), and may be stored in this state until further processing is necessary (see also FIG. 1). It should be noted that when dried, the material is fragile and brittle.

Therefore, care must be given so as not to damage the material in its dried state. The dried material is then processed in the same manner as, and in place of, fresh material, as detailed herein (or as described for Variation 1).

Variation 3: Pre-Triester Drying

Fresh tissue material is processed in the same manner as described in either the general description or variation 1 and/or variation 2. However, the material is allowed to air dry for 48 hours (hung up vertically in a temperature of 20-22° C.), after soaking in aqueous sugar alcohol/charcoal solution and rinsing with cold fresh water, and before subsequently being soaked in a sugar ester (triacetin or sorbitol hexaacetate) solution for a minimum of 24 hours (see also FIG. 4).

Variation 4: Vacuum Assisted Method

Material is processed in the same manner as described in the above general description or as described under Variation 1 and/or variation 2. However, in this variation, an aqueous sugar alcohol/charcoal solution is first heated to approx. 60° C. before the neutralised material, following acid/base treatment, is soaked in the solution. Additionally, this hot soaking process is performed within an enclosed container which is held under vacuum (−1 bar) for approximately 30 minutes. After slow release of the vacuum (thereby returning the pressure to that of atmospheric levels), the resultant material is then cold fresh water rinsed, and the process continued as see in either the above general description or as described under variation 2.

Variation 5: Pressure Assisted Method

Fresh material is processed in the same manner as described in either the general description or according to variation 1 and/or variation 2. However, the neutralised material is soaked in an aqueous sugar alcohol/charcoal solution contained within a sealed container which is held under pressure (approximately 6 bar), facilitated via the addition of pressurised nitrous oxide gas (dinitrogen monoxide; $N_2O$) for approximately 10 minutes. After the slow release of the pressure (thereby venting off nitrous oxide gas and the returning the pressure to that of atmospheric levels), the resultant material is then cold fresh water rinsed, and the process continued as shown in either the general description or variation 2.

Variation 6: Extended Base Soak

Tissue material is processed in the same manner as described in either the general description, or according variations 1, 2, 4 and/or 5. However, the material is allowed to soak in the neutralising base solution for a minimum of 30 minutes, before being rinsed with fresh cold water (see FIG. 2). This extended soak time facilitates the separation of the inner and outer layers of the material, which are then gently separated before being soaked in an aqueous sugar alcohol/charcoal solution, and the process continues as described in the general description or variation 3.

Variation 7: Stretching

Material is processed in the same manner as described in the general description and/or as described under any of the above variations. However, following the aqueous sugar alcohol/charcoal solution soak and rinsing with cold fresh water, the material is stretched, before being directly soaked in a sugar ester (triacetin or sorbitol hexaacetate) for a minimum of 24 hours (see FIG. 4). Stretching can be done by use of a stretching rack or other conventional means, including securing (e.g. using a elastic bands) to a cylindrical object. Optionally, the tissue material is dried prior to sugar ester treatment.

Variation 8: Dying

Material is processed in the same manner as described in either the general description or as described under any of the above variations. However, in the acid incubation step, either water soluble food grade, or vegetable based dye(s) are added to the acid solution before the fresh or dried starting material is soaked in it (see FIG. 2). The process then continues as described in the general description or variation 3.

Variation 9: Vacuum drying Material is processed in the same manner as described in the general description, or according to any of the above described variations. In this variation, the final air drying process, following treatment with a plasticizer such as triacetin is replaced by vacuum drying (see FIG. 4). Optionally, excess triacetin is dry wiped away prior to the vacuum drying. Freshly processed material is subjected to a constant low heat (20° C.) and high vacuum (−1 bar), suspended within a closed chamber for up to 60 minutes in order to greatly increase the drying rate.

Variation 10: Material Coating

Material is processed in the same manner as described in the general description, or according to any of the above mentioned variations. However, in this variation, an extra coating may be applied to the final dried material, either in addition to that obtained via a sugar ester surface treatment agent (e.g., triacetin or sorbitol hexaacetate) soak, or in place of it (see FIG. 4). The coating solution used is a warm mixed preparation of skimmed milk, water, gelatine and clove oil, and is applied directly to the surface of the material (see also FIG. 5). The same solution may also be used as a bio-adhesive to help bond two strips of prepared material together, or to attach prepared material to other textile types.

Variation 11: Fixing

Material is processed in the same manner as described in the general description, or as described in any of the above mentioned variations, but with the omission of the triester soak step. Material obtained directly after the sugar alcohol/charcoal and cold fresh water rinsed step is air or vacuum dried. The dried material is then soaked (submerged) for 24 hours in a mixed solution of acetic anhydride and imidazole (1 g of imidazole for every 25 ml of acetic anhydride used). The material is then carefully removed from the solution before being rinsed in cold fresh water, and then washed in a saturated aqueous solution of sodium bicarbonate (sodium hydrogen carbonate; $NaHCO_3$). A final cold fresh water rinse is then followed by the resultant material being allowed to dry (either air or vacuum) (see FIG. 4).

The physical properties of material obtained by the process according to the invention can be determined using conventional methods. The following are results obtained by using the protocols and methods described in Example 11.

Results—*Laminaria digitate:*
1. Thickness of material:
   a) Stipe: 3.9-4.5 mm (average—4.1 mm)
   b) Blade: 0.2-1.4 mm (average—0.6 mm)
2. Breaking Force of blade material (dry material −20° C., 75% RH): 20 kg/cm$^2$
3. Stretch properties of blade material: 30-40% at 22 kg (50 lbs)
4. Humidity and Temperature Stability of blade material—
   a) Relative humidity increased to 95% RH and temperature reduced to 20° C. (over 8 hours): Using a fixed force, lengthwise stretch of 5.3 mm, width wise 4.5 mm
   b) Relative humidity reduced to 15% RH and temperature increased to 32° C. (over 16 hours): Using a fixed force, lengthwise shrinkage of −2.2 mm, width wise −2.0 mm
5. Flame Resistance (blade)—
   a) After flame time: lengthwise 3.2 sec, width wise 3.0 sec
   b) After Glow time: lengthwise 1.8 sec, width wise 1.4 sec
   c) Char length: lengthwise 39 mm, width wise 36 mm
6. Ultra-violet light (UV-A) resistance: Class 4 minimum (minor fading) at 40 hours.
7. Sugar alcohol content (blade): 8-10% (glycerol or sorbitol) of dry weight of processed material (prior to treatment with a surface treatment agent such as a sugar alcohol)

*Saccharina latissima*
1. Thickness—
   a) Stipe: 2.9-3.9 (average—2.5 mm)
   b) Blade: 0.2-1.3 (average—0.5 mm)
2. Breaking Force (dry material −20° C., 75% RH): 25 kg/cm$^2$
3. Stretch properties: 40-60% at 22 kg (50 lbs)
4. Humidity and Temperature Stability—
   a) Relative humidity increased to 95% RH and temperature reduced to 20° C. (over 8 hours): Using a fixed force, lengthwise stretch of 6.2 mm, width wise 5.1 mm
   b) Relative humidity increased to 15% RH and temperature increased to 32° C. (over 16 hours): Using a fixed force, lengthwise shrinkage of −2.7 mm, width wise −1.9 mm
5. Flame Resistance (12 sec)—
   d) After flame time: lengthwise 4.2 sec, width wise 4.0 sec
   e) After Glow time: lengthwise 2.2 sec, width wise 2.0 sec
   f) Char length: lengthwise 54 mm, width wise 45 mm
6. Ultra-violet light (UV-A) resistance: Class 2 minimum (high degree of fading) at 40 hours
7. Sugar alcohol content (blade): 6-8% (glycerol or sorbitol) of dry weight of processed material A non-exhaustive representative list of embodiments of the present invention is provided in the following:
1. A process of tissue preservation, the process comprising steps of:
   a. treating a tissue from one or more plant, fungus or algae species, or a mixture thereof, with an aqueous weak acid solution to generate a pretreated tissue material;
   b. removing excess acid by rinsing the pretreated tissue material with an aqueous solution;
   c. incubating the pretreated tissue material with an aqueous solution comprising of at least one sugar alcohol;
   d. removing excess aqueous sugar alcohol to generate a preserved tissue material; and
   e. drying the resulting preserved tissue material.
2. The process of the previous embodiment, wherein the tissue is from an aquatic plant or aquatic algae.
3. The process of any one of the previous embodiments 1-2, wherein the tissue is tissue from a marine algae or marine plant.
4. The process of the previous embodiment 1-3, wherein the marine algae is a marine macroalgae.
5. The process of the previous embodiment, wherein the marine macroalgae is selected from the group consisting of *Laminaria digitata, Saccharina latissima* and *Alaria esculenta.*
6. The process of any one of the previous embodiments, wherein the tissue is from a marine algae, and wherein the resulting preserved tissue material is suitable for use as a textile.
7. The process of any one of the previous embodiments 1-6, wherein the tissue has a macromolecular structure with a total surface area of at least 1 cm$^2$, preferably at least 10 cm$^2$, more preferably at least 50 cm$^2$, more preferably at least 100 cm$^2$, more preferably at least 200 cm$^2$ and even more preferably at least 500 cm$^2$.
8. The process of the previous embodiment, wherein the tissue has a sheet-like structure with an average thickness in the range of about 0.1 to 5 mm.
9. The process of any one of the previous embodiments 1-8, wherein the weak acid has a pKa in the range of about 1 to 7, preferably in the range of about 2 to 6, more preferably in the range of about 3 to 6.
10. The process of any one of the previous embodiments 1-9, wherein the weak acid is an organic acid or mixture of organic acids.
11. The process of any one of the previous embodiments 1-10, wherein the aqueous weak acid solution comprises at least one organic acid selected from the group consisting of acetic acid, lactic acid and citric acid, or mixtures thereof.
12. The process of any one of the previous embodiments 1-11, wherein the aqueous weak acid solution further comprises at least one dye.
13. The process of any one of the previous embodiments 1-12, wherein the aqueous weak acid solution has a pH in the range of about 1 to about 5, preferably about 2 to about 4, more preferably about 2 to about 3.
14. The process of any one of the previous embodiments 1-13, wherein the rinsing with an aqueous solution in step b) comprises rinsing with a weakly basic aqueous solution.
15. The process of any one of the previous embodiments 1-14, wherein the rinsing with an aqueous solution in step b) comprises rinsing with an aqueous solution comprising at least one weak base.
16. The process of the previous embodiment, wherein the weak base has a pKa in the range of about 8 to 11, preferably in the range of about 9 to 11.
17. The process of any one of the previous embodiments 1-16, wherein the aqueous solution in step b) has a pH in the range of about 7 to about 10, preferably about 8 to about 10, more preferably about 8 to about 9.

18. The process of any one of the previous three embodiments, wherein the weak base comprises sodium bicarbonate.
19. The process of any one of the previous embodiments 1-18, wherein following the treatment steps a)-b), the cellular structure of the tissue material is intact.
20. The process of any one of the previous embodiments 1-19, wherein prior to the treatment with acid in step a), the tissue is dried.
21. The process of any one of the previous embodiments 1-20, wherein prior to the treatment with acid in step a), the tissue is treated with at least one tissue-penetrating colouring agent.
22. The process of the previous embodiment, wherein prior to the drying in step e), the preserved tissue material is rinsed with an aqueous solution.
23. The process of any one of the previous embodiments 1-22, wherein the incubating with sugar alcohol is performed at a temperature in the range of about 10° C. to about 90° C., more preferably about 20° C. to about 80° C., even more preferably about 20° C. to about 60° C.
24. The process of any one of the previous embodiments 1-23, wherein the incubating with sugar alcohol is performed at room temperature.
25. The process of any one of the previous embodiments 1-24, wherein following the incubation with sugar alcohol, the pre-treated tissue is rinsed with fresh water.
26. The process of any one of the previous embodiments 1-25, wherein the aqueous sugar alcohol solution in step d) further comprises activated charcoal.
27. The process of any one of the previous embodiments 1-26, wherein following the incubation with sugar alcohol, the pre-treated tissue is stretched.
28. The process of any one of the previous embodiments 1-27, wherein the drying of the plant-derived textile material in step e) is performed under vacuum.
29. The process of any one of the previous embodiments 1-28, further comprising a step (f) of treatment of the preserved tissue material with at least one surface treatment agent, preferably a water-resistant agent.
30. The process of the previous embodiment, wherein the surface treatment agent is a natural or synthetic wax, a fatty acid methyl ester or a triester, preferably triacetin.
31. The process of any one of the previous embodiments 1-30, further comprising treating the resulting textile material with at least one bio-adhesive material.
32. The process of the previous embodiment, wherein the bio-adhesive material is a water-resistant material.
33. The process of any one of the previous embodiments 1-32, wherein one or more aqueous solution in the process comprises one or more salt, preferably in an amount to result in salinity of about 35 ppm.
34. A preserved textile material obtained by the process of any one of the embodiments 1-33.
35. A textile material having a sheet-like structure with an average thickness in the range of about 0.2-5 mm, the textile material comprising tissue from at least one plant, fungus or algae species, or combinations of tissue from at least one plant, fungus or algae species, the tissue having an essentially intact cellular structure; the textile material further comprising about 2% to about 20% (w/w) sugar alcohol.
36. The textile material of embodiment 35, wherein the material comprises in the range of about 4% to about 10% sugar alcohol.
37. The textile material of any one of the previous embodiments 35-36, wherein the sugar alcohol is a glycerol or sorbitol.
38. The textile material of the previous embodiment, further characterized in that the material has a tensile strength that is at least about 5 kg/cm$^2$, preferably at least about 10 kg/cm$^2$, more preferably at least about 20 kg/cm$^2$.
39. The textile material of any one of the previous embodiments 35-38 wherein the material is from a macroalgae.
40. The textile material of the previous embodiment, wherein the macroalgae is selected from the group consisting of *Laminaria digitata, Saccharina latissima* and *Alaria esculenta*.
41. The textile material of any one of the preceding embodiments 35-40, characterized in that the textile is stable with respect to natural degradation processes.
42. The textile material of any one of the preceding embodiments 35-41, characterized in that the textile further comprises at least one surface treatment agent.
43. The textile material of the previous embodiment, wherein the surface treatment agent is a fatty acid methyl ester or a triester, preferably triacetin.
44. The textile material of any one of the previous embodiments 35-43, further comprising at least one coating.
45. The textile material of the previous embodiment, wherein the coating comprises at least one bio-adhesive and/or water-resistant material.
46. The textile material of any one of the previous embodiments 35-45, further comprising at least one dye.
47. A tissue material having a sheet-like structure with an average thickness in the range of about 0.2-5 mm, the tissue material comprising tissue from at least one plant, fungus or algae species, or combinations of tissue from at least one plant, fungus or algae species, the tissue having an essentially intact cellular structure; the tissue material further comprising about 2% to about 20% (w/w) sugar alcohol.
48. The tissue material of the previous embodiment, wherein the tissue material comprises in the range of about 4% to about 10% sugar alcohol, preferably glycerol or sorbitol.
49. The tissue material of any one of the previous two embodiments 47 or 48, further characterized in that the material has a tensile strength that is at least about 5 kg/cm$^2$, preferably at least about 10 kg/cm$^2$, more preferably at least about 20 kg/cm$^2$.
50. The tissue material of any one of the previous embodiments 47-49 wherein the tissue is from a macroalgae, preferably a macroalgae selected from the group consisting of *Laminaria digitata, Saccharina latissima* and *Alaria esculenta*.
51. The tissue material of any one of the preceding embodiments 47-49, characterized in that the material further comprises at least one surface treatment agent, preferably selected from a natural or synthetic wax, a fatty acid methyl ester and a triester, preferably triacetin.

As used herein, including in the claims, singular forms of terms are to be construed as also including the plural form and vice versa, unless the context indicates otherwise. Thus, it should be noted that as used herein, the singular forms "a," "an," and "the" include plural references unless the context clearly dictates otherwise.

Throughout the description and claims, the terms "comprise", "including", "having", and "contain" and their variations should be understood as meaning "including but not limited to", and are not intended to exclude other components.

The present invention also covers the exact terms, features, values and ranges etc. in case these terms, features, values and ranges etc. are used in conjunction with terms such as about, around, generally, substantially, essentially, at least etc. (i.e., "about 3" shall also cover exactly 3 or "substantially constant" shall also cover exactly constant).

The term "at least one" should be understood as meaning "one or more", and therefore includes both embodiments that include one or multiple components. Furthermore, dependent claims that refer to independent claims that describe features with "at least one" have the same meaning, both when the feature is referred to as "the" and "the at least one".

It will be appreciated that variations to the foregoing embodiments of the invention can be made while still falling within the scope of the invention. Features disclosed in the specification, unless stated otherwise, can be replaced by alternative features serving the same, equivalent or similar purpose. Thus, unless stated otherwise, each feature disclosed represents one example of a generic series of equivalent or similar features.

Use of exemplary language, such as "for instance", "such as", "for example" and the like, is merely intended to better illustrate the invention and does not indicate a limitation on the scope of the invention unless so claimed. Any steps described in the specification may be performed in any order or simultaneously, unless the context clearly indicates otherwise.

All of the features and/or steps disclosed in the specification can be combined in any combination, except for combinations where at least some of the features and/or steps are mutually exclusive. In particular, preferred features of the invention are applicable to all aspects of the invention and may be used in any combination.

EXAMPLES

In the following, non-limiting experimental examples in accordance with the invention are described. All of the tested conditions have found to result in workable products (textiles), although the physical characteristics of the final treated material (textile) is found to vary depending on the treatment protocol. Additionally there are variations in the starting and final treated materials that result from the presence of natural variation (e.g. colour and size), as can be expected in products derived from natural sources (i.e. due to variable genetics and growing conditions).

In particular, the physical properties of the final product are dependent on (i) the incubation with acid, both composition of acid mixture and length of incubation period with acid; (ii) treatment with surface agent (e.g. triacetin), and (iii) coating.

Example 1: Different Concentrations/Ratios and Soak Times of Aqueous Acids, Acid Mixes, Base and Sugar Alcohol The following examples provide numerous variations of different compositions, concentration and soak times of treatment of tissue material with acids, acid mixes, base and sugar alcohol are described and that have been performed.

Example 1a) Ascorbic acid: Several aqueous concentrations of ascorbic acid were made (0.25%, 0.5%, 1%, 2%, 3%, 4%, 5%, and 7%; all being v/v). Each concentration was then tested using either fresh or air/oven dried material (*Laminara digitata* and *Saccharina lattisima*), which was allowed to soak in the acid (12 hours, 24 hours, 3 days, or 7 days). Air drying was performed by vertically hanging the material at a temperature of 20-22° C. Oven drying was done at about 40° C. for 6 hours. This was followed by a brief water wash and soak in different concentrations of aqueous sodium bicarbonate solution (1%, 2%, 3%, 4%, and 5%), for no longer than 10 minutes. Another water wash was employed, before then processing the material further using either the general description, or the vacuum assisted method (see variation 3) using different concentrations of heated (60° C.) aqueous glycerol solution (25% and 50%), and applying a vacuum of −1 bar for approximately 30 minutes.

Example 1b) Acetic acid: Several aqueous concentrations of acetic acid were made (1%, 2%, 3%, 4%, 5%, and 7%). Each concentration was then tested using either fresh or air/oven dried material (*L. digitata* and *S. lattisima*), which was allowed to soak in the acid (12 hours, 24 hours, 3 days, or 7 days). This was followed by a brief water wash and soak in aqueous sodium bicarbonate solution (3%), for no longer than 10 minutes. Another water wash was employed, before then processing the material further using either the general description, or the vacuum assisted method (see variation 3) using different concentrations of heated (60° C.) aqueous glycerol solution (25% and 50%), and applying a vacuum of −1 bar for approximately 30 minutes.

Example 1c) Citric acid: Several aqueous concentrations of citric acid were made (3%, 4%, 5%, and 7%). Each concentration was then tested using either fresh or air/oven dried material (*L. digitata* and *S. lattisima*), which was allowed to soak in the acid (24 hours, 3 days, or 7 days). This was followed by a brief water wash and soak in aqueous sodium bicarbonate solution (3%), for no longer than 10 minutes. Another water wash was employed, before then processing the material further using either the general description, or the vacuum assisted method (see variation 3) using different concentrations of heated (60° C.) aqueous glycerol solution (25% and 50%), and applying a vacuum of −1 bar for approximately 30 minutes.

Example 1d) Lactic acid: Several aqueous concentrations of lactic acid were made (1%, 2%, 4%, 6%, 25%, 50%, and 100%). Each concentration was then tested using either fresh or air/oven dried material (*L. digitata* and *S. lattisima*), which was allowed to soak in the acid (24 hours, 3 days, or 7 days). This was followed by a brief water wash and soak in aqueous sodium bicarbonate solution (3%), for no longer than 10 minutes. Another water wash was employed, before then processing the material further using either the general description, or the vacuum assisted method (see variation 3) using different concentrations of heated (60° C.) aqueous glycerol solution (25% and 50%), and applying a vacuum of −1 bar for approximately 30 minutes.

Example 1e) Acetic and citric acid mix: Several aqueous concentrations of acetic and citric acid were made (2%, 4%, 7%), and combined in a variety of ratios (1:9, 1:4, 1:3, 2:3, 7:3, 1:1, 3:7, 3:2, 3:1, 4:1, and 9:1). Each concentration/ratio was then tested using either fresh or air/oven dried material (*L. digitata* and *S. lattisima*), which was allowed to soak in the acid (24 hours, 3 days, or 7 days). This was followed by a brief water wash and soak in aqueous sodium bicarbonate solution (3%), for no longer than 10 minutes. Another water wash was employed, before then processing the material further as described herein in the general description, or specified and the vacuum assisted method (see variation 3) using different concentrations of heated (60° C.) aqueous glycerol solution (25% and 50%), and applying a vacuum of −1 bar for approximately 30 minutes.

Example 1f) Lactic and citric acid mix: Aqueous concentrations of acetic and lactic acid were made (7%), and combined in a variety of ratios (1:9, 1:4, 1:3, 2:3, 7:3, 1:1, 3:7, 3:2, 3:1, 4:1, and 9:1). Each concentration/ratio was then tested using either fresh or air/oven dried material (*L. digitata* and *S. lattisima*), which was allowed to soak in the acid (24 hours, 3 days, or 7 days). This was followed by a brief water wash and soak in aqueous sodium bicarbonate solution (3%), for no longer than 10 minutes. Another water wash was employed, before then processing the material further using either the general description, or the vacuum assisted method (see variation 3) using different concentrations of heated (60° C.) aqueous glycerol solution (25%, 40% and 50%), and applying a vacuum of −1 bar for approximately 30 minutes.

Example 1g) Lactic and acetic acid mix: Aqueous concentrations of acetic and lactic acid were made (7%), and combined in a variety of ratios (1:9, 1:4, 1:3, 2:3, 7:3, 1:1, 3:7, 3:2, 3:1, 4:1, and 9:1). Each concentration/ratio was then tested using either fresh or air/oven dried material (*L. digitata* and *S. lattisima*), which was allowed to soak in the acid (24 hours, 3 days, or 7 days). This was followed by a brief water wash and soak in aqueous sodium bicarbonate solution (3%), for no longer than 10 minutes. Another water wash was employed, before then processing the material further using either the general description, or the vacuum assisted method (see variation 3) using different concentrations of heated (60° C.) aqueous glycerol solution (25%, 40% and 50%), and applying a vacuum of −1 bar for approximately 30 minutes.

Example 1h) Acetic, lactic and citric acid mix: Aqueous concentrations of acetic, lactic and citric acid were made (7%), and combined in a variety of ratios (1:1:1, 8:1:1, 7:2:1, 6:3:1, 5:4:1, 4:5:1, 3:6:1, 2:7:1, 1:8:1, 1:7:2, 1:6:3, 1:5:4, 1:4:5, 1:3:6, 1:2:7, 1:1:8, 2:1:7, 3:1:6, 4:1:5, 5:1:4, 6:1:3, and 7:1:2). Each concentration/ratio was tested using either fresh or air/oven dried material (*L. digitata* and *S. lattisima*), which was allowed to soak in the acid (24 hours, 3 days, or 7 days). Also *Alaria esculenta* was used, but only an acid mix ratio of 6:3:1 was employed. The acid treatment was followed by a brief water wash and soak in aqueous sodium bicarbonate solution (3%), for no longer than 10 minutes. Another water wash was employed, before then processing the material further using either the general description, or the vacuum assisted method (see above under variation 3) using a heated (60° C.) aqueous glycerol solution (25%), and applying a vacuum of −1 bar for approximately 30 minutes.

Example 1i) Acetic, lactic and L-ascorbic acid mix: Aqueous concentrations of acetic, lactic and L-ascorbic acid were made (7%), and combined in a variety of ratios (1:1:1, 8:1:1, 7:2:1, 6:3:1, 5:4:1, 4:5:1, 3:6:1, 2:7:1, 1:8:1, 1:7:2, 1:6:3, 1:5:4, 1:4:5, 1:3:6, 1:2:7, 1:1:8, 2:1:7, 3:1:6, 4:1:5, 5:1:4, 6:1:3, and 7:1:2). Each concentration/ratio was tested using either fresh or air/oven dried material (*L. digitata* and *S. lattisima*), which was allowed to soak in the acid (24 hours, 3 days, or 7 days). This was followed by a brief water wash and soak in aqueous sodium bicarbonate solution (3%), for no longer than 10 minutes. Another water wash was employed, before then processing the material further using either the general description, or the vacuum assisted method (see variation 3) using a heated (60° C.) aqueous glycerol solution (25%), and applying a vacuum of −1 bar for approximately 30 minutes.

It was noted that high proportion of acetic acid tends to result in mechanically tougher but more brittle material. Further, high proportion of lactic acid resulted in more flexible, but more fragile material. Also, high proportion of citric acid can affect pigment coloration.

Example 1i) Calcium hydroxide base: Aqueous concentrations of acetic, lactic and L-ascorbic acid were made (7%), and combined in a variety of ratios (6:3:1, 5:4:1, 4:5:1, 3:6:1, 2:7:1, 1:8:1, 1:7:2, 1:6:3, 1:5:4, 1:4:5, 1:3:6, 1:2:7, 1:1:8, 2:1:7, 3:1:6, 4:1:5, 5:1:4, 6:1:3, and 7:1:2). Each concentration/ratio was tested using either fresh or air/oven dried material (*L. digitata* and *S. lattisima*), which was allowed to soak in the acid (24 hours, 3 days, or 7 days). This was followed by a brief water wash and soak in aqueous calcium hydroxide solution (3%), for no longer than 10 minutes. Another water wash was employed, before then processing the material further using either the general description, or the vacuum assisted method (see variation 3) using a heated (60° C.) aqueous glycerol solution (25%), and applying a vacuum of −1 bar for approximately 30 minutes.

Based on the above experiments, it was in general concluded that increased concentration and/or prolonged incubation with acetic acid leads to formation of tougher but more brittle material. Incubation with increased amount of lactic acid resulted in more flexible, but more fragile material. Further, incubation with increased amount of citric acid can affect pigment coloration, in a way that the green colour is lighter.

Example 2: Different Concentrations and Soak Times of Aqueous Base

Example 2a) Acetic, lactic and citric acid mix: Aqueous concentrations of acetic, lactic and citric acid were made (7%), and combined in a ratio of 6:3:1. Either fresh or air/oven dried material (*L. digitata* and *S. lattisima*), was allowed to soak in the acid mix for 24 hours. This was followed by a brief water wash and soak in different concentrations of aqueous sodium bicarbonate solution (0%, 3%, 5%, 10%, and 25%) for different lengths of time (5, 10, 15, 20, and 30 minutes). Another water wash was employed, before the outer (pigmented) and inner (translucent) layers of the material were carefully separated using a thin steel spatula. These resultant layers were then further processed using either the general description, or the vacuum assisted method (see variation 3) using a heated (60° C.) aqueous glycerol solution (25%), and applying a vacuum of −1 bar for approximately 30 minutes.

Example 2b) Calcium hydroxide base: Aqueous concentrations of acetic, lactic and ascorbic acid were made (7%), and combined in a variety of ratios (1:1:1, 8:1:1, 7:2:1, 6:3:1, 5:4:1, 4:5:1, 3:6:1, 2:7:1, 1:8:1, 1:7:2, 1:6:3, 1:5:4, 1:4:5, 1:3:6, 1:2:7, 1:1:8, 2:1:7, 3:1:6, 4:1:5, 5:1:4, 6:1:3, and 7:1:2). Each concentration/ratio was tested using either fresh or air/oven dried material (*L. digitata* and *S. lattisima*), which was allowed to soak in the acid (24 hours, 3 days, or 7 days). This was followed by a brief water wash and soak in different concentrations of aqueous calcium hydroxide solution (0%, 0.3%, 0.5%, 1%, and 2.5%) for different lengths of time (5, 10, 15, 20, and 30 minutes). Another water wash was employed, before then processing the material further using either the general description, or the vacuum assisted method (see variation 3) using a heated (60° C.) aqueous glycerol solution (25%), and applying a vacuum of −1 bar for approximately 30 minutes.

Example 3: Different Concentrations, Ratios, Temperatures, and Soak Times of Aqueous Sugar Alcohols with Activated Charcoal Example 3a) Glycerol, sorbitol, and activated charcoal: Aqueous concentrations of acetic, lactic and citric acid were made (7%), and combined in a ratio of 6:3:1. Either fresh or air/oven dried material (*L. digitata* and *S. lattisima*), was allowed to soak in the acid mix for 24 hours. This was followed by a brief water wash and soak in a 3% aqueous sodium bicarbonate solution, for no longer than 10 minutes. Another water wash was employed, before then processing the material further using either the general description, or the vacuum assisted method (see variation 3) using different concentrations (25%, 50%, and 100%), and ratios (glycerol:sorbitol—0:1, 1:1, 2:1, 3:1, 4:1, 1:4, 1:3, 1:2, 1:0), of variably heated (20° C., 40° C., 50° C., 60° C., and 70° C.) aqueous sugar alcohol solution containing varying amounts of deodorising activated charcoal (0%, 0.5%, 1%, 2%, 2.5%, and 5% by weight, in relation to the final volume of solution used), and either applying a vacuum of −1 bar for approximately 30 minutes or leaving to soak for no more than 48 hours (preferably 24 hours). After being washed with fresh water, the preserved tissue material was then soaked (submerged) in a sugar ester (i.e. either triacetin or sorbitol hexaacetate), containing varying amounts of deodorising activated charcoal (0%, 0.5%, 1%, 2%, 2.5%, and 5% by weight, in relation to the final volume of solution used), for a period of at least 12 hours, and more preferably more than 24 hours. The resultant material was then removed, and the excess trimester/charcoal mix is drained and/or wiped away, before being allowed to air dry for up to 48 hours, for example by letting the material hang vertically at a temperature of 20-22° C.

Example 4: Different Drying Methods

Example 4a) Air dry: Both freshly harvested/cleaned material, and processed samples that had treatment with acid/base and glycerol (*S. latissima, L. digitata*, and *A. esculenta*), were placed horizontally or hung vertically indoors, and allowed to air dry (18-22° C., with moderate ventilation) over a period of 48 hours.

Example 4b) Sun dry: Processed samples (*S. latissima* and *L. digitata*), were hung vertically outside and allowed to dry in full sunlight (23-30° C.) over a period of 5-6 hours.

Example 4c) Oven dry: Both freshly harvested/cleaned material, and processed samples, using the standard method and any variation described above (*S. latissima* and *L. digitata*), were dried using a laboratory oven set at various temperatures (30° C., 40° C., and 60° C.), over differing period of time (2, 4, 6, 12, and 24 hours). Additionally, freshly harvested/cleaned material were dried in either a rolled up state or as cut strips.

Example 4d) Vacuum dry: Processed samples (*S. latissima* and *L. digitata*) obtained using the standard method and any variation described in the above, were hung vertically inside a vacuum chamber and allowed to dry under high vacuum (−1 bar) and moderate heat (30-40° C.) over a period of 2 hours.

Example 5: Pressure Method

Example 5a) Nitrous oxide: Aqueous concentrations of acetic, lactic and citric acid were made (6%), and combined in a ratio of 6:3:1. Either fresh or air/oven dried material (*L. digitata, S. lattisima* and *A. esculenta*), was allowed to soak in the acid mix for 24 hours. This was followed by a brief water wash and soak in a 3% aqueous sodium bicarbonate solution, for no longer than 10 minutes. Another water wash was employed, before then processing the material further by using a 25% aqueous glycerol/charcoal solution placed within a sealed pressure container. The addition of pressurised nitrous oxide gas (dinitrogen monoxide; $N_2O$, also known as dinitrogen monoxide), facilitated a positive pressure within the container (approximately 6 bar), where it was then held at this stated pressure for 10 minutes. After this time, the slow release of the pressure (in which venting off nitrous oxide gas returned the internal pressure of the container to that of atmospheric levels), the resultant material was then removed and washed in cold water (thereby removing excess glycerol solution), before being dried.

Example 6: Stretch Experiments

Example 6a) Cylinder: Freshly processed samples (*S. latissima* and *L. digitata*), whilst still in their wet state, were either wrapped around cylindrical objects, or pinned/clamped to a rack to facilitate the stretching process, and then left to air dry over a period of 48 hours.

Example 6b) Rack: Freshly processed samples (*S. latissima* and *L. digitata*), whilst still in their wet state, were pinned/clamped to a rack to facilitate the stretching process. The rack was then placed within a vacuum chamber, where both high vacuum (−1 bar) and moderate heat (30-40° C.) were applied to dry the stretched material over a period of 2 hours.

Example 7: Dyeing Experiments

Example 7a) Food dye: Different colours of concentrated commercial food grade dye (red, green and blue) were applied to dried processed material (*S. latissima* and *L. digitata*) in a petri dish. Once the material had been completely coated in the dye, it was then hung vertically and allowed to dry (18-22° C.) over a period of 3 hours.

Example 7b) Natural dye glycerol: Different natural colour pigment extracts were obtained by aqueous extraction (1:5) of *Beta vulgaris* (fresh taproot), *Curcuma longa* (fresh tuber), *Coffee arabica* (roasted, ground beans), and *Allium cepa* (fresh bulb). Aqueous concentrations of acetic, lactic and citric acid were made (7%), and combined in a ratio of 6:3:1. Either fresh or air/oven dried material (*L. digitata* and *S. lattisima*), was allowed to soak in the acid mix for 24 hours. This was followed by a brief water wash and soak in a 3% aqueous sodium bicarbonate solution, for no longer than 10 minutes. Another water wash was employed, before then processing the material further using either the general description, or the vacuum assisted method (see variation 3) using heated (60° C.) 25% aqueous glycerol solution (here the aqueous pigment extracts were used in place of the water for dilution, and no activated charcoal was added), and applying a vacuum of −1 bar for approximately 30 minutes.

Example 7c) Natural dye acid: Different natural colour pigment extracts were obtained by aqueous extraction (1:5) of *Beta vulgaris* (fresh taproot) and *Curcuma longa* (fresh tuber). Aqueous concentrations of acetic, lactic and citric acid were made (7%—here the aqueous pigment extracts were used in place of the water for dilution), and combined in a ratio of 6:3:1. Either fresh or air/oven dried material (*L. digitata* and *S. lattisima*), was allowed to soak in the acid mix for 24 hours. This was followed by a brief water wash and soak in a 3% aqueous sodium bicarbonate solution, for no longer than 10 minutes. Another water wash was employed, before then processing the material further using either the general description, or the vacuum assisted method (see variation 3) using heated (60° C.) 25% aqueous glycerol solution (no activated charcoal was used), and applying a vacuum of −1 bar for approximately 30 minutes.

Example 8: Cleaning, Coating and Adhesion

Example 8a) Natural bio-adhesive: 45 ml of waste acid mix-acetic/lactic/citric acid (3:6:1), recovered from the acid soaking process detailed in the general description method (possibly containing alginate and other carbohydrates), was heated to 40° C. Different amounts of powdered or leaf gelatine (1 g, 2 g and 3 g), agar (1 g, 2 g, and 3 g), carrageenan (1 g, 2 g, and 3 g), and glycerine (1%, 2%, 5%, and 10% of final volume), were then added to, and dissolved in, the hot acid mix with stirring. The solution was then applied to the outer layer of the processed material (*L. digitata* and *S. lattisima*), as a coating, and/or used as an adhesive to glue pieces together or to other textile materials.

Example 8b) Waterproof bio-adhesive: 45 ml of semi-skimmed milk (or milk powder dissolved in water to the same volume) was heated to 40° C. Different amounts of powdered or leaf gelatine (1 g, 2 g and 3 g), agar (1 g, 2 g, 3 g, and 4 g), glycerine (1% and 2% of final volume), and oil of cloves (dropwise), were then added to, and dissolved in, the hot acid mix with stirring. The solution was then applied to the outer layer of the processed material (*L. digitata* and *S. lattisima*), as a coating, and/or used as an adhesive to glue pieces together or to other textile materials.

Example 8c) Clean: The outer layers of processed dried material (*L. digitata* and *S. latissima*) was wiped clean with pure acetone to prevent "glycerine sweating".

Example 8d) Triacetin soak: Either freshly prepared or dried processed material (*S. latissima, L. digitata* and *A. esculenta*) was soaked (submerged) in pure triacetin for 24 hours. After this time, the material was removed, and the excess triacetin was wiped clean from the outer layers, before being vertically air dried for a further 24 hours.

Example 8e) Sorbitol hexaacetate soak: Either freshly prepared or dried processed material (*S. latissima, L. digitata* and *A. esculenta*) was soaked (submerged) in pure sorbitol hexaacetate for 24 hours. After this time, the material was removed, and the excess sorbitol hexaacetate was wiped clean from the outer layers, before the material being vertically air dried for a further 24 hours.

Example 9: Fixing (Formation of Triacetin In Situ)

Example 9a) Triacetin synthesis: Dried processed material (*L. digitata* and *S. latissima*) was soaked (submerged) in a solution of imidazole in acetic anhydride for 24 hours with constant stirring. After this time, the material was removed and rinsed in distilled water, before being soaked in a 10% aqueous solution of sodium bicarbonate for 1 hour. The material was then rinsed with distilled water, before then being vertically air dried for 24 hours.

Example 10: Ultra Violet Treatment

Example 10a) Dried processed material (*L. digitata* and *S. latissima*), which may or may not have been subjected to triacetin soaking, was subjected to ultra violet light rays (UV-A) for a set period (1, 2, 5, 12, 24 or 40 hours).

Example 11: Sugar Alcohol Content

Example 11a) Glycerol: Multiple air-dried raw material (*L. digitata* and *S. latissima*) samples were prepared, all of which had the same weight (100 g). These samples then underwent the processing treatment as detailed in the general description, using 25% glycerol solution as the sugar alcohol. After completely drying these processed samples (without sugar ester soaking), using the same technique as was employed to achieve the original dried raw material, their weights were then compared with the original dried raw material from the respective same species. Differences in weight were noted, and converted into % of glycerol of dry weight of material.

Example 11a) Sorbitol: Multiple air-dried raw material (*L. digitata* and *S. latissima*) samples were prepared, all of which had the same weight (100 g). These samples then underwent the processing treatment as detailed in the general description, using 25% sorbitol solution as the sugar alcohol. After completely drying these processed samples (without sugar ester soaking), using the same technique as was employed to achieve the original dried raw material, their weights were then compared with the original dried raw material from the respective same species. Differences in weight were noted, and converted into % of sorbitol of dry weight of material.

Test of Textile Physical Properties

The following standard tests (from the American Society for Testing and Materials; ASTM) were applied to macroalgae materials (*L. digitata* and *S. latissima*), processed using the method described in the general description:
  I. D1777-96: Standard Test Method for Thickness of Textile Materials.
  II. D5035-11: Standard Test Method for Breaking Force and Elongation of Textile Fabrics (Strip Method).
  III. D6207-03: Standard Test Method for Dimensional Stability of Fabrics to Changes in Humidity and Temperature.
  IV. D6614-07: Standard Test Method for Stretch Properties of Textile Fabrics—CRE Method.
  V. D6413/D6413M-15: Standard Test Method for Flame Resistance of Textiles (Vertical Test).

In addition to these tests, the Association of Textiles, Apparel and Materials Professionals Standard (AATCC 16-Colorfastness to light), was employed to determine the material's susceptibility to UV bleaching. Also, experiments were conducted to determine the amount of sugar alcohol present in the processed, dry material (see Example 11 for more details of method used).

Example 12. Processing of Plant and Fungi

Experiments were conducted using the following raw materials, employing the base method described herein, both with and without being subjected to sugar ester soaking:
  I. Fresh banana—leaf (*Musa* sp.).
  II. Fresh mushrooms—fruiting body (*Agaricus bisporus*).

For both banana leafs and fresh mushrooms, the treated material maintained the integrity of the original material, and being characterized by pliability and water resistance, indicating that the process is equally applicable to the preservation of banana leafs and fresh mushrooms.

Treated material, such as those above from banana leafs and mushrooms, or those from other vegetative species such as cacti can, following treatment, be sliced into sheets or segments of appropriate thickness for downstream use in the generation of textiles.

Example 13. Stitching and Washing Test

Three pieces of treated *Laminaria digitate* where stitched onto squares of denim material. The seaweed was found to take well to stitching. Three washing tests were performed: 1) Machine wash at 40 degrees Celsius; 2) Professional dry cleaning; 3) Sponge/spot cleaning.

Results: Machine washing led to some aging/drying of material and some creasing. Dry cleaning left the material unchanged, with minimal (1-2%) shrinkage. Spot/sponge cleaning left no visible changes or shrinkage of the material.

Example 14. Stitching and Washing Test

A total of 5 samples of treated seaweed (*Laminaria digitata*) were stitched onto denim fabric patches and the resulting fabric wash by hand in lukewarm water and dried naturally (no added heat). The material was found to take well to stitching, with little or no apparent moisture appearing in stitched areas.

In the following examples, the time given for the acid and base incubation steps is a sum of both steps. The acid was in all cases about 7.5% acetic acid in water, and the base solution sodium bicarbonate (about 14 g/L) in water. In all cases, the base incubation was from 10 to 30 minutes, with the remaining time being the time of the acid incubation. When birch root powder was added, it was so done to achieve a final concentration of about 10 g/L. Glycerol concentration was 33% (1 volume glycerol to 2 volumes water).

Patch 1
  Birch Root Powder added to acid solution.
  Acid/base incubation: 4 hours
  Glycerol incubation: 4 hours
  With this sample the seaweed shrinks quite a bit after the wash and does not return to original state, causing the fabric to bunch up and be creased.

Patch 2
  Birch root powder added to acid/base solution.
  Acid base incubation: 4 hours
  Birch root powder added to glycerol solution; incubation time 4 hours Patch 3
  Birch root powder added to acid solution
  Acid/base incubation: 13 hours
  Glycerol incubation: 9 hours Patch 4
  Birch root powder added to acid, base and glycerol solutions.
  Acid/base incubation: 12 hours
  Glycerol incubation: 10 hours Patch 5
  Birch root powder added to acid, base and glycerol solutions.
  Acid/base incubation: 13 hours
  Glycerol incubation: 9 Hours
  With all 4 of the other batches the seaweed shrinks a bit to begin with, but then returns to its original state leaving the fabric looking normal after it has been dried.

These experiments show that light washing of treated seaweed is possible.

Example 15. Humidity Testing and Surface Treatment

The samples from Example 14 were exposed to ambient humid conditions (at ambient temperature). The samples were found to be stable to humidity upon storage for several days, with no moisture forming on the material.

Several methods of waterproofing were tested: Beeswax, Jojoba oil, Nikwax® (polymer-based wax).

Jojoba oil: Seaweed found to be soft and lightly moist, with appealing smell. Can be re-applied without saturating. After 1 week there was no stickiness to material, which could also handle small amounts of rain. The material could be stitched with reduced moisture in stitched regions.

Beeswax: Material silky and smooth, not at all sticky or damp. Resistant to light rain. Remained without stickiness after 1 week. The stitched seaweed was no longer sticky.

Nikwax®: Seaweed becomes smooth and dry without drying out. Remains smooth and dry after 1 week. Material could be stitched without moisture in stitched regions. Material could tolerate heavy rain.

For all treated samples, waterproofing resulted in material that does not absorb moisture from the environment, and can be hand washed without damage.

The invention claimed is:

1. A preserved macroalgae tissue material with essentially intact cellular structure comprising a macroalgae and a sugar alcohol, wherein the sugar alcohol is glycerol and wherein the preserved macroalgal tissue is obtained by a process comprising steps and order of:
   a. treating a tissue from a macroalgae with an aqueous weak acid solution to generate a pretreated tissue material;
   b. removing excess acid by rinsing the pretreated tissue material with an aqueous solution;
   c. soaking the pretreated tissue material in an aqueous solution comprising at least one sugar glycerol;
   d. removing excess glycerol to generate a preserved tissue material; and
   e. drying the resulting preserved tissue material.

2. A preserved tissue material having a sheet-like structure with an average thickness in the range of from 0.2 to 5 mm, the tissue material comprising tissue from a macroalgae, the tissue having an essentially intact cellular structure; the tissue material further comprising in the range from 2% to 20% (w/w) glycerol.

3. The tissue material of claim 2, wherein the tissue material comprises in the range from 4% to 10% glycerol.

4. The tissue material of claim 2, further characterized in that the material has a tensile strength that is at least 5 kg/cm$^2$.

5. The tissue material of claim 2 wherein the tissue is from a macroalgae selected from the group consisting of *Laminaria digitata*, *Saccharina latissima* and *Alaria esculenta*.

6. The tissue material of claim 2, characterized in that the material further comprises at least one surface treatment agent selected from a natural or synthetic wax, a fatty acid methyl ester and a triester.

7. The tissue material of claim 2, wherein the material has a tensile strength that is at least 10 kg/cm$^2$.

8. The tissue material of claim 2, wherein the material has a tensile strength that is at least 20 kg/cm$^2$.

9. The tissue material of claim 1, wherein the tissue is from a macroalgae selected from the group consisting of *Laminaria digitata*, *Saccharina latissima* and *Alaria esculenta*.

10. The tissue material of claim 2, characterized in that the material further comprises a surface treatment agent that is triacetin.

\* \* \* \* \*